Patented Aug. 23, 1932

1,872,700

UNITED STATES PATENT OFFICE

CAMILLE DREYFUS, OF NEW YORK, N. Y.

METHOD OF CARRYING OUT ORGANIC CHEMICAL REACTIONS IN IMPROVED REACTION MEDIA

No Drawing.　　Application filed April 20, 1926. Serial No. 103,389.

My invention deals with the use of a substitute for sulphuric acid in chemical reactions where the sulphuric acid is used as a medium of reaction, that is where the sulphuric acid does not itself enter into the reaction.

The object of this invention is to provide a substitute for sulphuric acid in these reactions—a substitute which not only performs the functions of sulphuric acid but also greatly reduces the danger and risk attendant upon these reactions. Another object of this invention is to provide a method of esterification without the aid of sulphuric acid as a medium of reaction. Another object of this invention is to provide a process of nitrating organic compounds (such as toluol, phenol, cellulose, etc., for example, in the manufacture of explosives) in the presence of phosphoric acid as a medium of reaction and without the use of appreciable quantities of sulphuric acid. Still another object of this invention is to provide a method of alkylating or etherifying wherein the use of appreciable amounts of sulphuric acid as a medium of reaction is dispensed with, the sulphuric acid being replaced by phosphoric acid, with or without the addition of other reaction promoters. Yet another object is to obtain new and improved products as a result of these reactions. Other objects, features and advantages of my invention will appear more fully in the following detailed description and in the appended claims.

I have now found that phosphoric acid can be used advantageously as a reaction medium, in place of sulphuric acid, in a general way in chemical reactions, especially where during the reaction water or its equivalents for example HCl etc. are split off. The processes of nitration, esterification, etherification, acetylization, haloidation, benzylation, phenolation, etc. etc. are illustrations of processes wherein my new process can be utilized.

Heretofore it has been the general practice to conduct chemical reactions, wherein water or its equivalents (for the purpose of this invention) such as HCl, HBr, etc. are formed, in the presence of large amounts of concentrated sulphuric acid. The presence of these large amounts of sulphuric acid, while usually necessary, is undesirable for several reasons, some of which are hereinafter set out. Thus, these reactions must be carried on at low temperatures and with the utmost care in order to avoid violent destruction of the reaction products, explosions, etc. due to the reactivity of the strong sulphuric acid. Also the yields are usually low and the final products are impure and must be extensively purified to fit them for industrial uses. There are other disadvantages attending the use of sulphuric acid in such reactions but the above are some of the most serious drawbacks and are responsible for the prevention of a wider application of the above chemical reactions.

By the use of my invention, the above reactions can be carried out within a wider range of temperature, since the phosphoric acid is not only an efficient reaction medium but also prevents the destruction of the reaction products and the constituents of the reaction mixture.

The products, obtained in the above reaction where phosphoric acid replaces sulphuric acid as a reaction medium, are of a much better quality and a higher stability than the products heretofore obtained by these reactions. Apart from these advantages, this new invention is also important from an economic point of view. Thus, for example, it enables the carrying out of the acetylation of a hydroxyl group in an alcoholic or phenolic body by the use of glacial acetic acid. This does away with the necessity of using acetic anhydride or acetyl chloride, etc., as required in the known processes. In a similar manner the formation of acetyl salicylate (aspirin) and triacetin, according to present methods, requires the use of acetic anhydride to perfect the reaction in a reasonable amount of time and in a satisfactory manner, whereas these reactions can be carried out in the presence of phosphoric acid as a reaction medium very satisfactorily and rapidly by the use of glacial acetic acid only.

The formation of ethers and esters of all kinds and descriptions is greatly facilitated by the use of this new process. Thus the manufacture of picric acid, trinitrotoluene (TNT) nitroglycerine, nitrocellulose, etc. can be very easily carried out and is attended with less danger when phosphoric acid is used as a reaction medium in place of sulphuric acid during the nitration. Not only can the above processes be more easily controlled but the products obtained are much superior in quality to those obtained by the old processes.

In general, the new process can be used for most chemical processes where the reaction results in the splitting off of water or hydrochloric acid or for similar acids or equivalents.

Where I use the expression phosphoric acid in the specification and claims, I mean orthophosphoric acid or metaphosphoric acid or other suitable phosphoric acids or mixtures of these acids. The presence of metaphosphoric acid or other phosphoric acids has a valuable influence on the promotion of these reactions, and where desired there can be added to the reaction mixture contact materials, catalyzers or condensing agents. Thus, the presence of small quantities of sulphuric acid or other similar acting materials is helpful in promoting the reaction.

The reactions can be executed within a wide range of temperature but in order to obtain high quality materials it is preferable to execute them at as low a temperature as convenient. The temperatures to be chosen in carrying on these reactions are dependent upon the ingredients present during the reaction. Where small quantities of sulphuric acid are present a low temperature is preferably employed. The same thing applies also, but not to the same extent, to the presence of metaphosphoric acid or similar acting ingredients.

The invention embraces the above reactions where they are performed in such a way so as to obtain the final product in solution or in suspension or where the reaction is completed in one or more stages. The quantities of ingredients used to carry out the reactions can be varied within a wide range, as can also the temperature and duration of the reaction. Where desired, orthophosphoric acid can be partially or entirely replaced by metaphosphoric acid in suitable quantities. The reactions can be carried on in the presence of additional ingredients, especially ingredients which have the property of extracting or absorbing water formed during the reaction, for example, sulphuric acid.

By having described my invention, what I now claim and desire to secure by Letters Patent is:

1. A method of carrying out chemical reactions in which at least one of the constituents is an organic compound and wherein water is formed which comprises substituting phosphoric acid containing small amounts of sulfuric acid as the reaction medium for the sulfuric acid formerly used in carrying out such reactions.

2. A method of preventing water formed during a chemical reaction in which at least one of the constituents is an organic compound from taking part in or interfering with the reaction which comprises substituting phosphoric acid containing small amounts of sulfuric acid as the reaction medium for the sulfuric acid formerly used in carrying out such reactions.

3. In a process of alkylation wherein a substance of the group consisting of water, hydrochloric acid, hydrobromic acid and hydriodic acid is split off, effecting the alkylation in the presence of a phosphoric acid as the reaction medium in place of sulfuric acid previously employed.

4. In a process of alkylation wherein a substance of the group consisting of water, hydrochloric acid, hydrobromic acid and hydriodic acid is split off, effecting the alkylation in the presence of a phosphoric acid containing small amounts of sulfuric acid as the reaction medium in place of sulfuric acid previously employed.

In testimony whereof, I have hereunto subscribed my name.

CAMILLE DREYFUS.